United States Patent [19]

Amborn et al.

[11] Patent Number: 5,232,416
[45] Date of Patent: Aug. 3, 1993

[54] METHOD AND DEVICE FOR THE VARIATION OF LOCKING RATES

[76] Inventors: Peter Amborn, In den Gärten 2, D-5206 Neunkirchen; Klaus Greulich, Mühlenstrasse 1, D-5461 Hollig; Wolfgang Hildebrandt, Am Herrengarten 3, D-5200 Siegburg, all of Fed. Rep. of Germany

[21] Appl. No.: 751,714

[22] Filed: Aug. 29, 1991

[30] Foreign Application Priority Data

Aug. 30, 1990 [DE] Fed. Rep. of Germany ....... 4027422

[51] Int. Cl.[5] .......................................... F16H 37/08
[52] U.S. Cl. .................................. 475/252; 475/248; 475/249; 475/346
[58] Field of Search ............... 475/220, 226, 227, 228, 475/248, 249, 252, 331, 334, 346, 344

[56] References Cited

U.S. PATENT DOCUMENTS

| 1,268,429 | 6/1918 | Brown | 475/226 |
|---|---|---|---|
| 2,900,846 | 8/1959 | Lehman | 475/252 X |
| 3,375,736 | 4/1968 | Saari | 475/252 X |
| 3,473,414 | 10/1969 | Shachter | 475/344 X |
| 5,055,096 | 10/1991 | Riemscheid et al. | 475/252 X |
| 5,071,395 | 12/1991 | Fahy et al. | 475/220 X |
| 5,083,987 | 1/1992 | Körner et al. | 475/252 X |
| 5,098,356 | 3/1992 | Guidoni et al. | 475/227 |
| 5,108,353 | 4/1992 | Brewer et al. | 475/227 |
| 5,122,101 | 6/1992 | Tseng | 475/252 |
| 5,169,370 | 12/1992 | Dye et al. | 475/226 |

FOREIGN PATENT DOCUMENTS

| 356401 | 2/1990 | European Pat. Off. | 475/248 |
|---|---|---|---|
| 3731668 | 4/1989 | Fed. Rep. of Germany | 475/249 |
| 59-97346 | 6/1984 | Japan | 475/249 |
| 62-246282 | 4/1989 | Japan | 475/226 |

*Primary Examiner*—Leslie A. Braun
*Assistant Examiner*—David E. Hann
*Attorney, Agent, or Firm*—Harness, Dickey & Pierce

[57] ABSTRACT

Method and apparatus for the varying locking rates of a differential gear system has a driven differential cage (1) with two coaxial axle shaft gears (9, 10) retained in cylindrical cavities (7, 8) within the cage. The gears (9, 10) are coupled to each other via groups of compensating gears (11, 12) positioned parallel thereto. Engagement of various compensating gear pairs (11, 12) with both axle shaft gears (9, 10) is sequentially rendered either effective or ineffective, in order to generate a variable, resultant radial and/or tangential force to be applied to the axle shaft gear (9, 10). The force generates a variable frictional force in the support bearings (7, 8) of the axle shaft gears.

15 Claims, 3 Drawing Sheets

METHOD AND DEVICE FOR THE VARIATION OF LOCKING RATES

BACKGROUND AND SUMMARY OF THE INVENTION

This invention relates to a method and apparatus for varying locking rates of a differential gear system. The system includes a driven differential cage with two coaxial axle shaft gears retained in cylindrical cavities in the cage. The gears are coupled to each other via pairs of meshed compensating gears positioned in cavities parallel to the axle gears.

The invention provides a method of varying locking rates, and for its implementation of several suitable differential gear systems of the aforementioned type, that will permit the varying of locking rates with minimum effort. Preferably, the system should provide a high locking rate when there is minimal traction detected on one wheel and thus minimal torque would be transmittable to the wheels and provide a low locking rate when high torques are being transmittable to the wheels due to good traction conditions, the control of which is through simple means. The solution lies in a method characterized in the engagement of various groups of meshing compensating gears with both axle shaft gears. The compensating gears are independently rendered either effective or ineffective in order to generate a variable resultant radial and/or tangential force to be applied to the axle shaft gears. The force generates a variable frictional force, at least on the periphery of the axle gears, inside the cylindrical cavities.

Such a method of incrementally varying the locking rates is simple to control, especially automatically as a result of torque controlled incremental engagement of additional groups of compensating gears. The resultant radial force applied to the axle shaft gears relatedly reduces the braking force generated by the resultant radial forces applied to these gears. The potential variation of the locking rate can reach a magnitude of approximately 70% when only one group of the compensating gears is in power-mesh with the axle shaft gears, and it is reduced down to a level of approximately 20-30% when all groups of compensating gears are in power-mesh with the axle shaft gears. In this case the locking rate is $$\frac{T_1 - T_2}{T_1 + T_2}$$

where $T_1$ and $T_2$ are the torque on the axle gears with $T_1 > T_2$.

A different gear system based on this invention has a driven differential cage in which two coaxial axle shaft gears, meshing on their external peripheries, are retained in cylindrical cavities, where the gears are coupled to each other via meshed compensating gears on parallel axes. The present invention includes at least one of the compensating gears provided with two toothed areas of different pitch. One of the toothed areas is meshed with one of the axle shaft gears, and the other area with at least one compensating gear that is associated with the other axle shaft gear. Also, an axial support means enables varying engagement of the compensating gears which provides variable force on the axle shaft gears.

Due to compensating gear tooth design, it is possible to have the compensating gear groups engage or become effective in a sequential manner. Engagement of the compensating gears with each other and the respective axle gears is accomplished only after relative axial shift of the compensating gears, as a gap is present between adjacent meshing teeth which provides the gear backlash. As the gears move axially, closing the gap between adjacent teeth, the compensating gears are power meshed with one another to transfer torque between the axle shaft gears if they are axially aligned. This is based on the torque-controlled axial force applied to the compensating gears, which overcomes axial spring force which is capable of limiting or biasing the shifting. Specifically, with a uniform backlash design, springs of different preloads may be specified for the individual compensating gear pairs. When using springs of uniform spring rates and initial preloads, different degrees of backlash may be used. Different degrees of backlash may be accomplished by means of different center distances between the compensating gears and the respective axle shaft gear. Alternatively, it is possible to utilize different tooth shapes.

As an alternative to this automatic configuration, an external control may be provided for the axial shifting of the support means having face-side support surfaces for the compensating gears, e.g. by hydraulic means.

The tooth areas covered by this invention need not be symmetrical with each other. A different pitch of any kind for at least one of the compensating gears coupled with the axle shaft gears would be appropriate.

As explained above, the curve locking rates versus torque transmitted, as generated by automatic controls, has a digressive trend. With external controls it is certainly possible to obtain locking rate curves of a different shape.

The subject matter of this invention can be equally applied to different gear systems having axle shaft gears in the form of sun gears, or in the form of internal ring gears. Additionally, an unequal torque distribution is possible by using different diameter axle shaft gears.

In order to guarantee a low locking rate as required during load reversals, for the benefit of directional control automatically, it is intended to design the gear backlash for the individual compensating gear groups to become effective at this status, to be uniform and to be overcome, free of opposing forces, by axial tooth forces. This requires each of the compensating gears with support means with axially shifting face-side support surfaces, to have on the side opposing the support means, secondary axial stop faces with uniform spacing relative to the compensating gear, so that during torque reversal, a low locking rate is obtained immediately upon contact between all the compensating gears and these secondary support surfaces.

Accordingly, a differential according to this invention may also have compensating gears with unequal helix angles between their two tooth sections, without necessarily having opposite sense of inclination. Essentially, for its engagement with the associated compensating gear and the associated axle shaft gears of the group, it is the axial position of each compensating gear that is critical. There is only one axial position for each compensating gear at which a given tooth load is obtained for an engagement with the axle shaft gear to guarantee the same tooth loads on all compensating gears. Depending on the shift direction, any deviation from this position, i.e. any shifting of a compensating gear, will result either in the tooth flanks of the axle shaft gear and the shifted compensating gear being additionally compressed while the remaining compensating gears are simultaneously relieved and lifted out of mesh, or in the relief of the shifted compensating gear and an additional loading of the remaining compensating gears. Any change in the axial loading causes a change in the resultant radial forces applied to the axle shaft gears, which determines the locking rates of a differential gear of said configuration.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENT OF THE INVENTION

Figure 1:
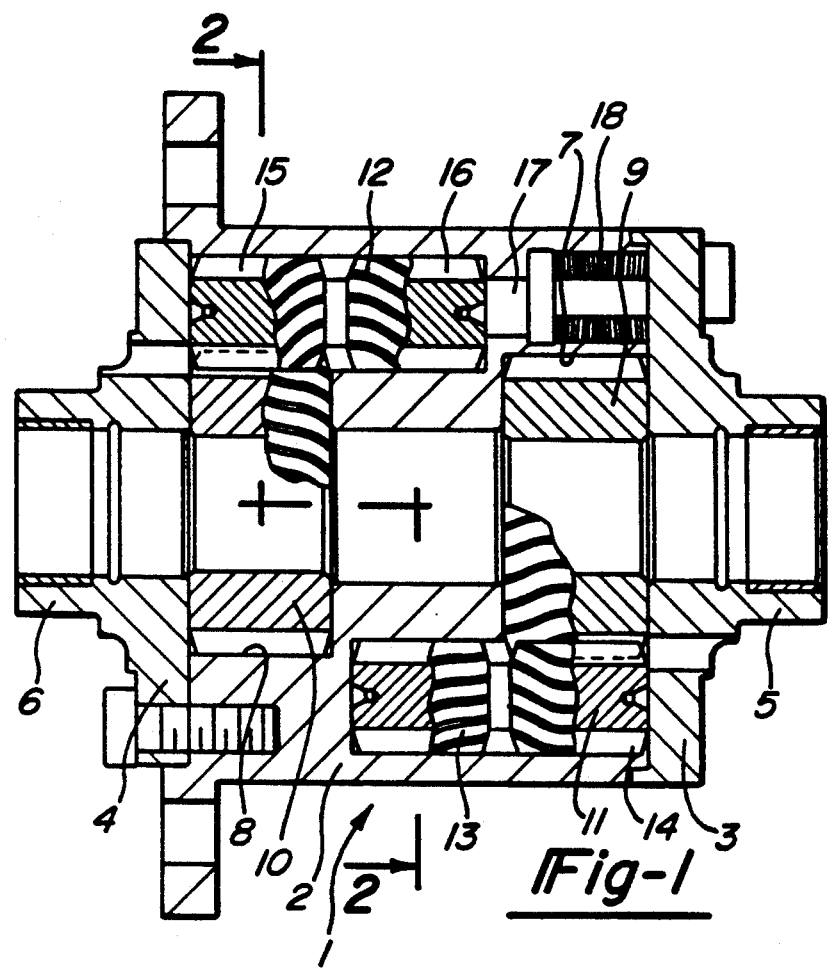
FIG. 1 is an axial cross sectional view through a differential cage of a differential gear in accordance with the present invention.
Figure 2:
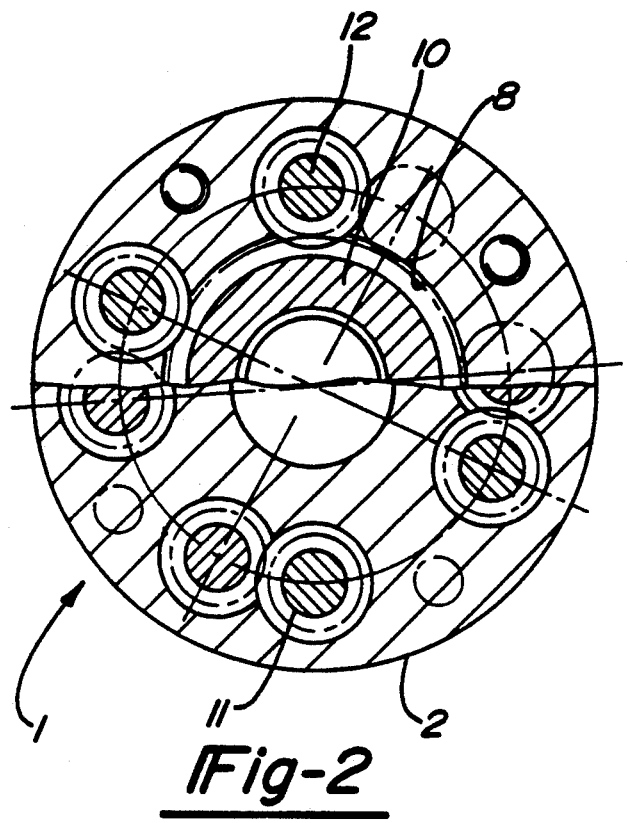
FIG. 2 is a cross sectional view of FIG. 1 through line 2—2 thereof.

FIGS. 1 and 2 illustrate a differential cage 1 which rotates in bearings of a differential housing, not shown in detail. It includes a central cage portion 2 with two cover components 3 and 4 having projections 5 and 6 to accept the bearings vis-a-vis the differential housing. Also, the cage portion 2 includes a flange to enable attachment of a ring gear. The cover components 3 and 4 are designed to axially secure the axle shaft gears 9 and 10 and compensating gears 11 and 12 within the cage portion 2.

The cage portion 2 includes an axial bore 7. A first axle shaft gear 9 is retained in the axial bore 7. An axial bore 8 is in the opposite side of the cage portion 2 which retains a second axle shaft gear 10. The axle shaft gear 9 is mated or meshed with one of several compensating gears 11, while the axle shaft gear 10 is mated or meshed with one of several compensating gears 12. The axle shaft gears 9 and 10 are designed with their helix angles in opposite senses.

Figure 3:
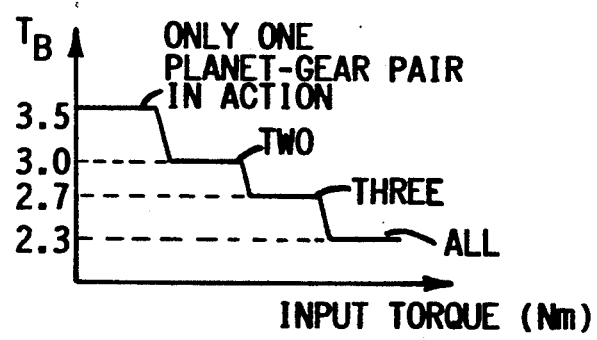
FIG. 3 is a diagram view of the characteristics curve for the differential as illustrated.

The compensating gears 11 and 12 each have two different tooth sections 13, 14, 15 and 16. The compensating gears 11 and 12 are held in cavities on the cage portion 2 which have axes parallel to the axes of the axial bores 7 and 8. Assuming that the compensating gear 11 is axially held in place inside the housing and has zero backlash relative to its axle shaft gear 9, and that the compensating gear 12, which can be axially shifted, has a backlash relative to the individually associated compensating gear 11 and has zero backlash relative to its axle shaft gear 10, it follows that an axial shifting of each compensating gear 12, in one direction or the other, is required to establish a flux of torque between the axle shaft gears. In actual practice though, backlash is not only found between the pairs of gears of compensating gears 11 and 12, but also between the compensating gears 11 and 12 and their respective axle shaft gears 9 and 10. When, however, the torque is reduced, as seen above, it becomes clear that under the preload of a spring set 18, which via an eccentric transfer bolt 17, acts upon the compensating gear 12, the axial shifting of the compensating gear 12 can be counteracted, allowing the compensating gear 12 to mesh with the associated compensating gear 12 only at higher torque levels. If the spring rates or the specifications for backlash between the compensating gears are different (e.g. $T_1 > T_2$, $T_1$ and $T_2$ being the torque on the axle gears), it is possible to plot the characteristic curve shown in FIG. 3 also for the engagement of additional pairs of compensating gears as the torque increases. $T_B$ is the torque bias defined as $T_1/T_2$.

Figure 1A:
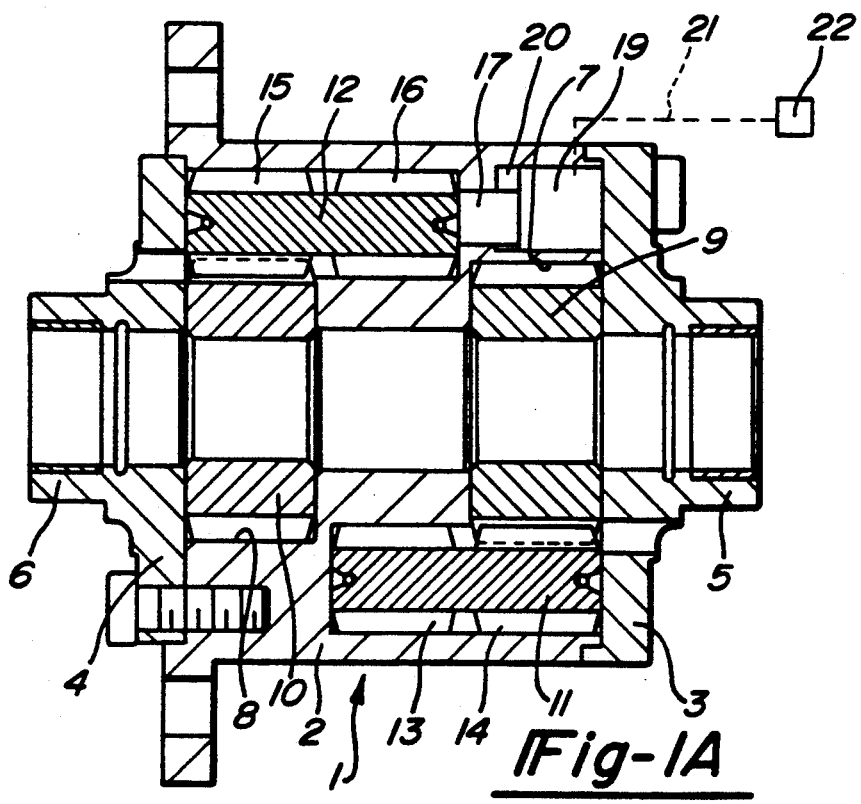
FIG. 1A is an axial cross sectional view like FIG. 1 of another embodiment of the present invention.

FIG. 1A illustrates another embodiment of the present invention. The differential cage is substantially similar to that previously discussed, however, the difference lies in the axial support mechanism. For example, a hydraulic cylinder piston element 19 may be provided in each parallel cavity. A duct 21 would couple the piston 19 to a pressure source 22. The pressure would act on a piston 20 and, via the transfer bolt, would axially move the compensating gear 12. Also, a spring 18 may be used to return the piston-cylinder element 19 to its starting position.

Also, the compensating gears 11 and 12 may be rendered effective or ineffective by exerting individual stepped forces by the individual springs. These forces counter act the effect of axial thrust gear tooth forces. Further, the compensating gears 11 and 12 may be rendered effective or ineffective by providing different degrees of backlash at each gear pair. A uniform spring force at each group would be exerted by uniform rate springs 18. These forces would oppose the generated axial thrust gear tooth forces.

While the above detailed description describes the preferred embodiment of the present invention, the invention is susceptible to modification, variation, and alteration without deviating from the scope and fair meaning of the subjoined claims.

We claim:

1. A method of varying the locking rate of a differential gear comprising:
   providing a differential gear with a cage having two coaxial axle shaft gears retained in cylindrical cavities in said cage, and a plurality of pairs of compensating gears positioned in said cage with their axes parallel to axes of said axle shaft gears, each of said pairs of compensating gears comprising gears which mesh with each other and with a respective axle shaft gear coupling said axle shaft gears with one another;
   providing a torque differential between said pair of axle shaft gears;
   engaging or disengaging into and out of force reactive contact the gears of at least a pair of said plurality of pairs of said compensating gears with one another independently of the gears of other pairs of said plurality of pairs of said compensating gears;
   providing a radial or tangential force on said axle shaft gears from the engagement of said plurality of pairs of said compensating gears; and
   varying the radial or tangential force on said axle shaft gears by axially moving at least one gear of said at least a pair of said compensating gears to engage or disengage the gears of said at least a pair of said compensating gears independently of the gears of said other pairs to provide variable backlash and variable locking of the differential.

2. The method according to claim 1, further comprising providing axial shifting of one of said compensating gears of a gear pair and a desired backlash between a meshing compensating gear pair for controlling engagement of said gear pair with said axle shaft gears.

3. The method according to claim 2, wherein said axial shift includes biasing one compensating gear of each of said gear pair with a desired preload, such that a biasing force control acts on gear tooth forces generating axial thrust.

4. The method according to claim 3, wherein said preload of each gear pair is different.

5. The method according to claim 2, wherein providing different degrees of backlash between said compensating gear pairs such that a biasing force providing axial shift on each of said gear pairs is uniform to oppose gear tooth forces generating axial thrust.

6. The method according to claim 2, wherein further comprising providing an externally mounted means for controlling engagement.

7. A differential gear comprising:
a differential cage having a pair of coaxial cylindrical cavities, and a plurality of cavities positioned parallel with said pair of coaxial cylindrical cavities;
a pair of axle shaft gears positioned in said pair of coaxial cylindrical cavities;
a plurality of pairs of compensating gears positioned in said plurality of parallel cavities;
at least one of said pairs of compensating gears having a compensating gear with two tooth areas of different pitch, one tooth area meshed with one axle shaft gear and the other tooth area meshed with the other compensating gear of said at least one of said pairs which is meshed with the other axle shaft gear; and
means for variably axially supporting at least one compensating gear of said at least one of said pairs of compensating gears, said axial supporting means providing a force on said at least one of said pairs of compensating gears such that these may be independently engaged or disengaged to force reactive contact in response to each force providing a variable radial or tangential force on said axle shaft gears to provide variable backlash and variable locking of the differential.

8. The gear system according to claim 7, wherein said axial support means for each of said compensating gears is arranged in planes that are axially spaced and arranged perpendicular to the axis of said compensating gears, where the axial positions of these axial support means are independently variable.

9. The gear system according to claim 7, further comprising means for at least partially varying the axial positions of the axial support means for each of said compensating gears by externally controlled shifting of the support surfaces for these compensating gears.

10. The gear system according to claim 7, wherein said axial support means include springs at one end of each of said compensating gear pairs.

11. The gear system according to claim 7, wherein said axial support means includes springs for the various groups of meshed compensating gears which have uniform spring rates and wherein face-side support surfaces of said compensating gears are axially unequally spaced relative to each other.

12. The gear system according to claim 7 wherein said axial support means includes springs for the various groups of meshed compensating gears which have different spring rates.

13. The gear system according to claim 11, wherein at least one of the springs is preloaded.

14. The gear system according to claim 12, wherein at least one of the springs is preloaded.

15. The gear system according to claim 7, wherein axial positions of said axial support means for each of said compensating gears can be at least partially varied by externally controlled shifting means of the face-side support surfaces of said compensating gears.

* * * * *

UNITED STATES PATENT AND TRADEMARK OFFICE
CERTIFICATE OF CORRECTION

PATENT NO. : 5,232,416
DATED : August 3, 1993
INVENTOR(S) : Peter Amborn, Klaus Greulich, Wolfgang Hildebrandt It is certified that error appears in the above-indentified patent and that said Letters Patent is hereby corrected as shown below:

On drawing sheet, delete Sheet 1 showing Figure 1 and Figure 1A, and substitute therefor Drawing Sheet attached hereto as page 2, showing Figure 1 and Figure 1A.

Figure 4:
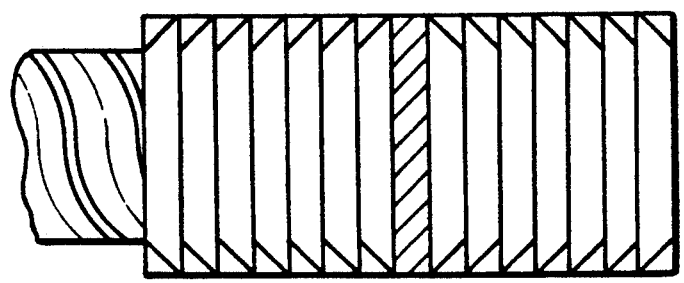
FIG. 4 is an elevation view of a preloaded spring mechanism.
Figure 4:
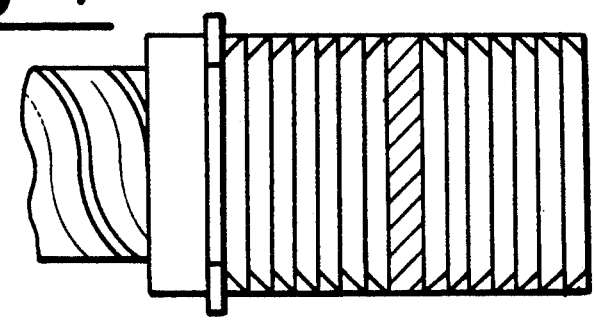
Figure 5:
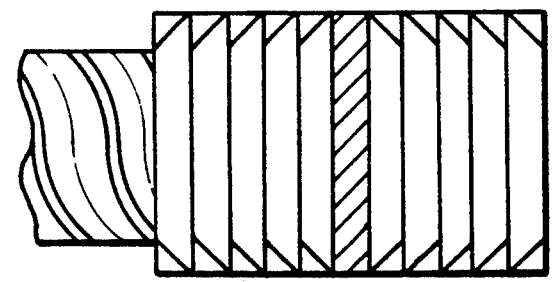
FIG. 5 is elevation view of another preloaded spring mechanism.
Figure 5:
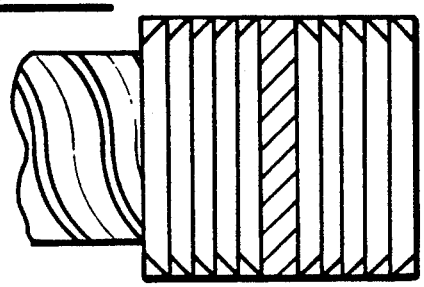
Figure 1:
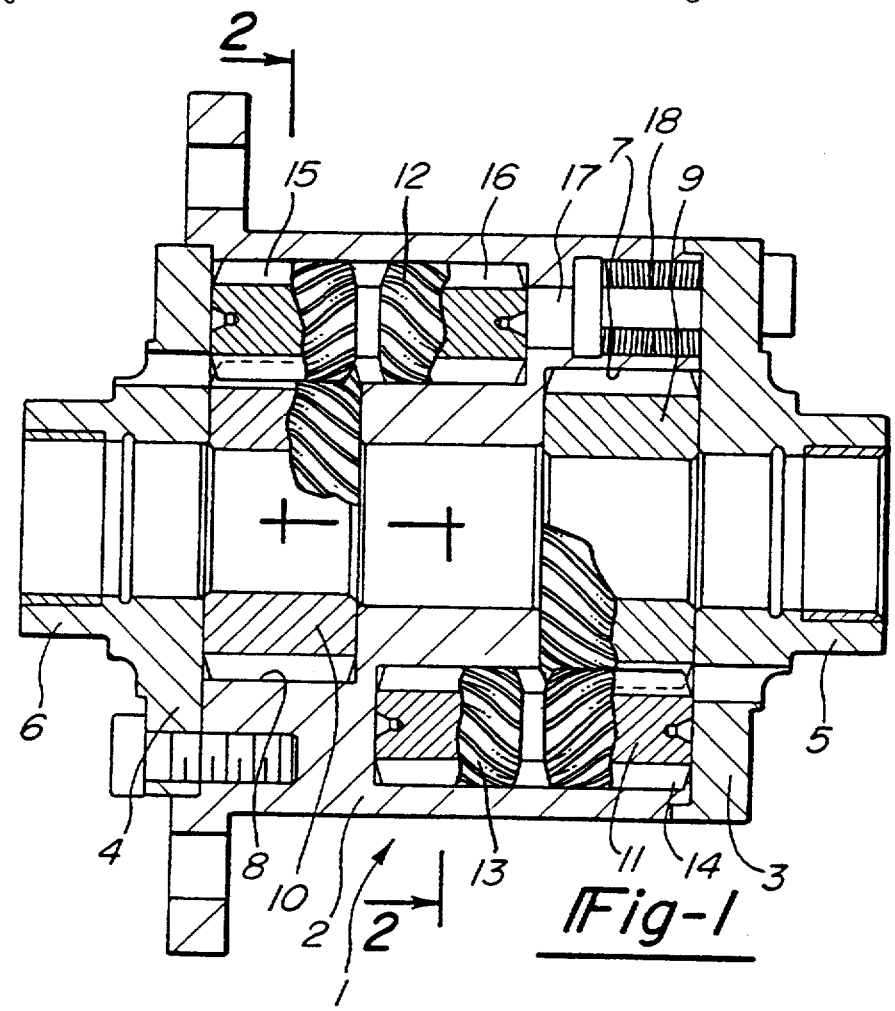
Figure 1A:
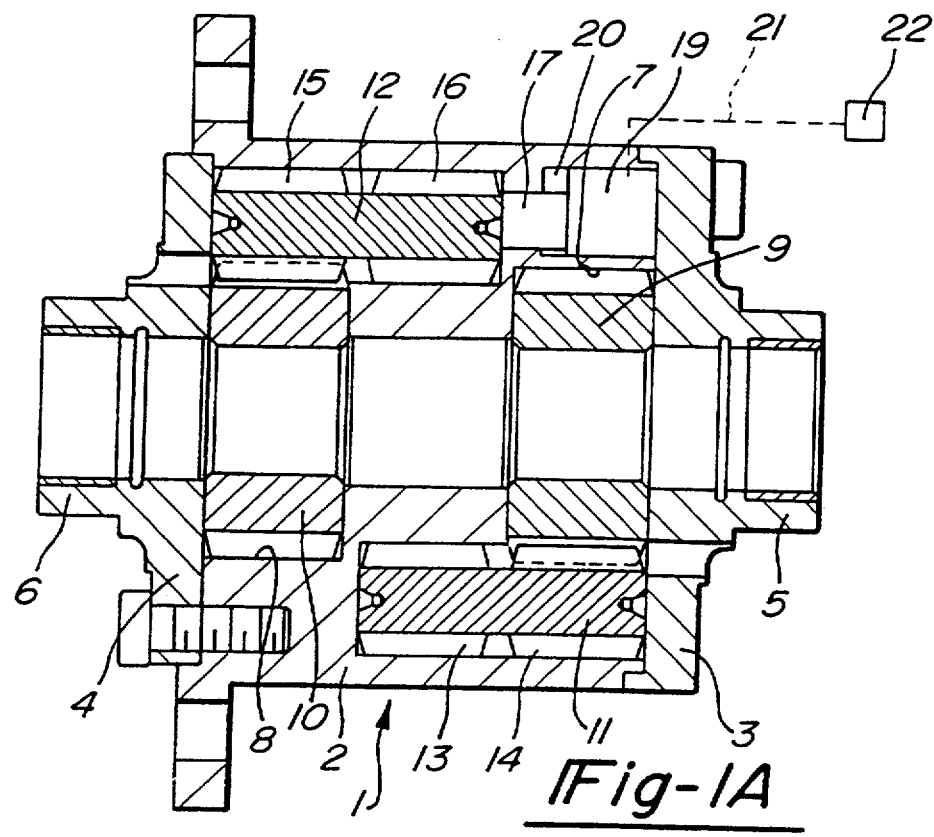
Figure 4:
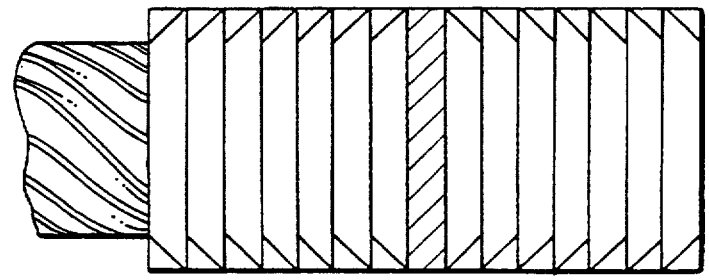
Figure 4:
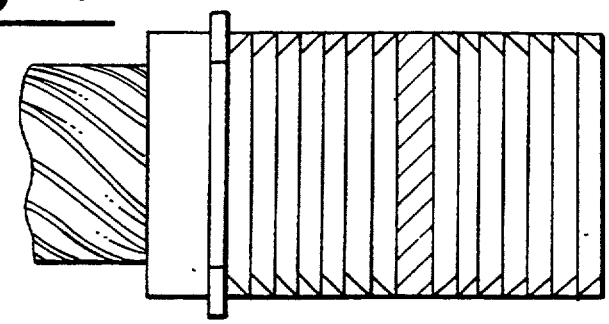
Figure 5:
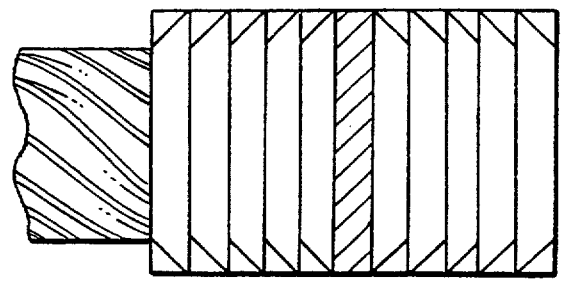
Figure 5:
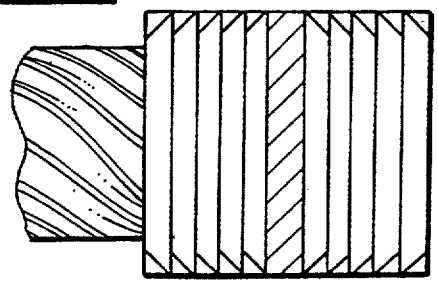

On drawing sheet, delete Sheet 3 showing Figure 4 and Figure 5, and substitute therefor Drawing Sheet attached hereto as page 3, showing Figure 4 and Figure 5.

Signed and Sealed this

Twenty-seventh Day of June, 1995

Attest:

BRUCE LEHMAN

Attesting Officer

Commissioner of Patents and Trademarks